US011433658B2

(12) United States Patent
Friedrich et al.

(10) Patent No.: US 11,433,658 B2
(45) Date of Patent: Sep. 6, 2022

(54) METHOD OF MAKING A PHYSICAL OBJECT BY ADDITIVE MANUFACTURING (71) Applicant: 3M INNOVATIVE PROPERTIES COMPANY, St. Paul, MN (US)

(72) Inventors: Anja Friedrich, Munich (DE); Christian A. Richter, Feldafing (DE); Malte Korten, Moorenweis (DE); Bastian Kirchner, Fürstenfeldbruck (DE); Michael Jahns, Gilching (DE); Karin Zanklmaier, Munich (DE); Gioacchino Raia, Türkenfeld (DE); Hans R. Schnagl, Jengen (DE); Andreas G. Herrmann, Munich (DE); Daniel D. Oberpertinger, Herrsching (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 199 days.

(21) Appl. No.: 16/631,199

(22) PCT Filed: Jul. 23, 2018

(86) PCT No.: PCT/US2018/043264
§ 371 (c)(1),
(2) Date: Jan. 15, 2020

(87) PCT Pub. No.: WO2019/023120
PCT Pub. Date: Jan. 31, 2019

(65) Prior Publication Data
US 2020/0215811 A1 Jul. 9, 2020

(30) Foreign Application Priority Data
Jul. 26, 2017 (EP) ..................................... 17183231

(51) Int. Cl.
*B33Y 10/00* (2015.01)
*B33Y 30/00* (2015.01)
(Continued)

(52) U.S. Cl.
CPC ............... *B33Y 10/00* (2014.12); *B33Y 30/00* (2014.12); *B22F 10/30* (2021.01); *B22F 10/40* (2021.01);
(Continued)

(58) Field of Classification Search
CPC ... B29C 64/106; B29C 64/227; B29C 64/245; B29C 64/35; B33Y 10/00; B33Y 30/00; B33Y 80/00; B22F 10/30; B22F 10/40
See application file for complete search history.

(56) References Cited

U.S. PATENT DOCUMENTS 5,354,414 A    10/1994   Feygin
6,234,948 B1    5/2001   Yavilevich
(Continued)

FOREIGN PATENT DOCUMENTS

CN        1605393       4/2005
CN       101564719     10/2009
(Continued)

OTHER PUBLICATIONS

International Search Report for PCT International Application No. PCT/US2018/043264, dated Oct. 5, 2019, 8 pages.
(Continued)

*Primary Examiner* — Nahida Sultana (57) ABSTRACT

A method of making a physical object by additive manufacturing. In the method a hardenable primary material is provided, the object is built up by successively hardening layers of the hardenable primary material, and the object is cleaned from excess material by moving the object and thereby generating a mass inertial force in the excess mate-
(Continued)

rial. The invention facilitates the making of objects by additive manufacturing.

10 Claims, 6 Drawing Sheets

(51) Int. Cl.
 *B33Y 40/00* (2020.01)
 *B33Y 70/00* (2020.01)
 *B33Y 80/00* (2015.01)
 *B29C 64/35* (2017.01)
 *B29K 105/00* (2006.01)
 *B22F 10/40* (2021.01)
 *B22F 10/30* (2021.01)
(52) U.S. Cl.
 CPC ........ *B29C 64/35* (2017.08); *B29K 2105/251* (2013.01); *B33Y 40/00* (2014.12); *B33Y 70/00* (2014.12); *B33Y 80/00* (2014.12)

(56) References Cited

U.S. PATENT DOCUMENTS

| | | | |
|---|---|---|---|
| 9,421,582 B1 | 8/2016 | Zolnierek | |
| 11,155,028 B1* | 10/2021 | Zhang | B29C 64/205 |
| 2004/0159340 A1 | 8/2004 | Hiatt | |
| 2008/0169585 A1 | 7/2008 | Zinniel | |
| 2013/0295215 A1 | 11/2013 | Wu | |
| 2015/0343705 A1 | 12/2015 | Chen | |
| 2016/0184189 A1 | 6/2016 | Hagiwara et al. | |
| 2016/0311163 A1 | 10/2016 | Yasukochi | |
| 2016/0332367 A1 | 11/2016 | Sun et al. | |
| 2017/0100899 A1 | 4/2017 | El-Siblani | |
| 2017/0157862 A1 | 6/2017 | Bauer | |
| 2019/0143597 A1* | 5/2019 | Huang | B22F 10/70 425/166 |
| 2020/0198233 A1* | 6/2020 | Yang | B33Y 50/02 |
| 2020/0337813 A1* | 10/2020 | Kirchner | B29C 64/35 |

FOREIGN PATENT DOCUMENTS

| | | |
|---|---|---|
| CN | 102989595 | 3/2013 |
| CN | 103522546 | 1/2014 |
| DE | 102006060720 | 6/2008 |
| EP | 0420614 | 4/1991 |
| GB | 1243944 | 8/1971 |
| JP | 4728560 | 4/1971 |
| KR | 20090002496 A | 1/2009 |
| WO | WO 2000-67981 | 11/2000 |
| WO | WO 2003-089218 | 10/2003 |
| WO | WO 2009-003696 | 1/2009 |
| WO | WO 2017-108645 | 6/2017 |
| WO | WO 2018-026640 | 2/2018 |
| WO | WO 2019-102304 | 5/2019 |

OTHER PUBLICATIONS

Ma Jianbiao, Functional Polymer Materials, first edition, Chemical Industry Press, Jul. 31, 2000, p. 310.
Liu Zheng, Stomatology Handbook, second edition, Oct. 31, 1997, p. 729.
Yang Huaiwei, Oral Clinical Restorative Materials Science, first edition, Tongji University Press, Aug. 31, 2016, pp. 51-52 and 101.
Wei Jun,, Polymer Synthesis Technology, first edition, University of Science and Technology Press, Feb. 28, 2011, pp. 12-14.

* cited by examiner

METHOD OF MAKING A PHYSICAL OBJECT BY ADDITIVE MANUFACTURING

FIELD OF THE INVENTION

The invention relates to a method of making a physical object by additive manufacturing. In particular the invention relates to a method in which the object is cleaned from excess material by moving the object and thereby generating a mass inertial force in the excess material.

BACKGROUND ART

In a variety of technical fields physical objects or mechanical workpieces are more and more manufactured by additive manufacturing processes.

Such additive manufacturing processes typically allow for building up an object in its desired individual shape, by subsequently adding material to create that shape. So-called subtractive processes in which an object is machined from an oversized blank by removal of material are more and more replaced by additive manufacturing processes.

While additive manufacturing processes are meanwhile widely used in the industry for rapid prototyping, the manufacturing of final products in many areas is still challenging. In particular for making dental restorations it is generally required to use materials that are compatible for use in a human body. Further, a dental restoration manufactured by a build-up process must fulfill requirements to mechanical stability as well as expectations about aesthetics, for example concerning color shading and translucency.

Some additive manufacturing processes are based on stereolithography. Stereolithography generally uses light for hardening light hardenable or photopolymerizable resins. Data based on computer aided design and/or computer aided manufacturing (CAD/CAM) are used to project a light pattern on a layer of light hardenable resin. The photosensitive resin typically solidifies in consequence of the exposure of the light so that a layer of solidified resin according to the pattern is formed. A desired three-dimensional object is created by consecutively adding layers. Thereby the pattern is controlled according to the desired outer shape of the three-dimensional object.

Typically at the boundary between the object and the light hardenable material some of the light hardenable material resides on the object after building up the object. The light hardenable material typically resides on the object in varying amounts, depending for example on the viscosity of the light hardenable material. This excess material is generally undesired because it forms an additional structure on the actual shape of the object and because the light hardenable material often is sticky, may contain undesired monomers and/or may (as such) not form a durable structure. Therefore, currently such residual light hardenable material is often post-cured to provide the object with a solid surface. According to another approach the object is cleaned mechanically or with aid of chemical solutions and optionally post-cured after.

Although existing approaches for cleaning objects that are made by additive manufacturing provide useful results there is still a need for a method that provides efficient cleaning and avoids damaging or affecting of the object. Such a method desirably should be usable for a variety of different additive manufacturing processes that operate based on different chemical materials for building up the object.

SUMMARY OF THE INVENTION

The invention relates to a method of making a physical object (further referred to as "object" herein) by additive manufacturing. The invention may particularly relate to a method of making a dental restoration or a dental appliance by additive manufacturing.

The method comprises the steps of:
(a) providing a hardenable primary material;
(b) building up the object by successively hardening portions or layers of the hardenable primary material; and
c) cleaning the object from excess hardenable material by moving the object and thereby (by the moving) generating a mass inertial force in the excess hardenable material.

excess material is formed by at least one of the hardenable primary material and a hardenable secondary material. This means that the excess material may be formed by the hardenable primary material, the hardenable secondary material or by a combination of the hardenable primary material and the hardenable secondary material.

The invention is advantageous in that it allows for extensively cleaning objects that are built up by additive manufacturing from undesired adherent excess material, for example from at least some of any hardenable primary or secondary material that adheres at the object. In particular the cleaning of the objects is noninvasive and contact-free. Therefore the object is prevented from structural damages or mechanical failures, for example as those may be caused by cleaning tools or cleaning agents. Further, because the cleaning is based on physical action, the cleaning is generally independent from the chemical composition of the excess material. In particular, no solvents or cleaning agents for chemically cleaning are required (although a chemical cleaning step may be applied in addition). Therefore the invention can be used with a variety of hardenable primary and secondary materials based on different chemical bases.

The term "mass inertial force" as referred to herein may be specified as force per unit mass and therefore may be specified in the unit $m/s^2$. Further, the mass inertial force can be expressed by the G-force which is a factor of the acceleration of gravity. For the purpose of the present specification the acceleration of gravity is 9.81 $m/s^2$. Consequently, for example a mass inertial force of 9.81 $m/s^2$ can be expressed as 1 G.

The term "hardenable primary material" preferably refers to non-hardened material of the type of material used to build up the object. Further, the term "hardenable secondary material" refers to a non-hardened material of a material that is different from the material from which the object is built up. The hardenable secondary material may be applied to the built up object, for example coated on the built up object for finishing. The term "hardenable" as used herein may comprise or correspond to "polymerizable".

The hardenable primary material and the hardenable secondary material and thus also the excess material are preferably liquid or pasty. Accordingly, the hardenable primary and secondary material and the excess material are also flowable. The hardenable primary and secondary material may not be a powder.

The excess material preferably does not form part of the object. In particular, the excess material may result from the particular type of additive manufacturing process used for making the physical object. For example the particular type of additive manufacturing process used for making the physical object may inherently result in undesired hardenable primary material to adhere at the object. Such adhering hardenable primary material may for example be present in the form of a film on an outer surface of the object.

According to the invention at least some of the adhering hardenable primary or secondary material is preferably caused to separate from the object in consequence of an acceleration force or mass inertial force acting on the adherent excess material. The acceleration force or mass inertial force is induced by moving, for example rotating, the object. The wording "caused to separate from the object" in that regard covers that portions of the adhering hardenable primary or secondary material separate out of the film that covers the outer surface of the object. Thus, the film may reduce during the cleaning step (c) of the invention. It is noted that a very thin and uniform film or particles of adhering hardenable primary or secondary material may remain after cleaning. However, such remaining film may be post-cured and therefore may finally form part of the object and may not belong to the excess material. Therefore the method of the invention preferably comprises the step of (d) post-curing residual hardenable primary or secondary material subsequent to step (c). Preferably the step of post-curing is performed using a non-patterned light source, for example a spot light or a surface emitter. It has been found that residual hardenable primary or secondary material tends to gather in corners of the object, for example at transitions of layers of the object, so that the residual hardenable primary or secondary, once hardened, helps providing a smooth (as opposed to a stepped) outer surface.

The additive manufacturing may be generally based on successively light hardening portions or layers of the hardenable primary material. The additive manufacturing (or additive manufacturing process) may comprise at least one of Stereolithography (SLA), Multi Jet Modeling (MJM) and Film Transfer Imaging (FTI). All of these additive manufacturing processes typically use liquid and/or pasty light hardenable materials for building up objects.

Stereolithography (SLA) is typically based on hardening portions, in particular layers, of the hardenable primary material by exposing selected portions of the hardenable primary material by light. Stereolithography typically uses a positionable Laser light beam for selectively hardening portions of the hardenable primary material. Further or alternatively a projector may be used as light source for selectively hardening portions of the hardenable primary material. One projector based additive manufacturing process is generally referred to Digital Light Processing™ (DLP). Stereolithography and projector based additive manufacturing processes (including DLP and others) are referred to herein as "Stereolithography", although in the field of additive manufacturing these processes may be understood to form alternatives.

In an embodiment the method of the invention is performed on a system for making a physical object by additive manufacturing. Accordingly the invention may additionally relate to a system that is configured for performing the method of the invention as disclosed herein. In particular, the system may comprise a device for additive manufacturing that is configured to perform at least the steps (a) and (b) of the method of invention. Further, the system may comprise a post-processing device that is configured to perform at least the step (c) of the method of the invention. The device for additive manufacturing and the post-processing device may be configured to operate independently from each other (for example may form the system in the form of two separate devices) or may operate in combination (for example may form one device or system in combination).

Preferably the system has a vat for receiving hardenable primary material and a build carrier for carrying the object. The build carrier forms a build surface. The build surface is preferably parallel to a support surface of the vat. The vat is preferably transparent or has at least a transparent bottom wall. The bottom wall preferably forms the support surface. The build surface and the support surface face toward each other. Further, the build surface preferably faces toward the center of gravity whereas the support surface faces in the opposite direction. The support surface supports a quantity of hardenable primary material (if such material is present). The vat accordingly has a circumferential side wall for retaining the hardenable primary material in the vat. The vat and the build carrier are preferably movable relative to each other. The vat and the build carrier preferably can be positioned relative to each other by Computer Numerical Control (CNC). In more particular, the vat and the build carrier are preferably movable and positionable relative to each other in a dimension perpendicular to the support surface and the build surface. This dimension is further referred to as "build dimension" herein. The build dimension further corresponds to a dimension in which the object is successively built up.

The system may be generally based on any of the processes mentioned above. In a particular embodiment the system is based on DLP, in which a light source, in particular an image projector is arranged beneath the vat on the opposite side of the build carrier. In such a system the object is moved away from the center of gravity during the additive manufacturing. Further, the projector projects light in a direction away from the center of gravity. The image projector is particularly arranged to project light in the form of an image through the support surface toward the carrier. The light is preferably selected in accordance to a photoinitiator comprised in the hardenable primary material. For example, in case an acyl phosphine oxide based photoinitiator like Irgacure® TPO is comprised in the hardenable primary the image projector preferably emits at least UV light of a wavelength of between 340 nm to 430 nm. Irgacure® TPO typically has an absorption spectrum of between 350 nm and 420 nm with an absorption maximum of about 381 nm. The image projector may however be configured for emitting light at further wavelengths. For example the image projector may be adapted to emit blue light within of a wavelength of at least between 450 nm to 495 nm and/or white light of a wavelength range of 380 nm-750 nm.

An alternative system also has a vat for receiving hardenable primary material and a build carrier for carrying the object. The build carrier forms a build surface which preferably faces away from the center of gravity. The support surface supports a quantity of hardenable primary material (if such material is present). The vat has a circumferential side wall for retaining the hardenable primary material in the vat. The vat and the build carrier are preferably movable relative to each other. The vat and the build carrier preferably can be positioned relative to each other by Computer Numerical Control (CNC). In more particular, the vat and the build carrier are preferably movable and positionable relative to each other in a dimension perpendicular to the build surface. The system may have a laser light source that is arranged above the vat. In such a system the object is moved toward the center of gravity during the additive manufacturing. Further, the laser light source projects light in a direction toward the center of gravity. The light is again preferably selected in accordance to a photoinitiator comprised in the hardenable primary material as described above.

In an embodiment the step (b) of building up the object may comprise the step of providing a layer from the hardenable primary material. Preferably the layer from the hardenable primary material is formed between the build surface and the support surface. In case a layer of the hardenable primary material has been previously hardened (as defined in step (b) of the method of the invention, the layer from the hardenable primary material is formed between the hardened layer and the support surface. For forming the layer the hardenable primary material may be provided in the vat and the build carrier and the vat may be positioned toward a determined position. Preferably the layer has a layer thickness along the build dimension. The distance between the build surface and the support surface corresponds to or forms the layer thickness. Once one or more layers of the object have been built up the layer thickness corresponds to the distance between the respective hardened layer and the support surface. The hardened layer that is located closest to the build surface is referred to as the bottom most hardened layer. The bottom most hardened layer has a surface that faces the support surface. Accordingly the layer from the hardenable primary material is formed between the surface of the bottom most hardened layer and the support surface, in case the object is at least partially built up.

In a further embodiment the method comprises the step of hardening a volume element of the layer of hardenable primary material. The volume element corresponds in thickness to the layer thickness. In particular the layer from hardenable primary material may be exposed to light emitted from the image projector. The volume element that hardens typically corresponds in shape to an image projected by the image projector toward the layer from hardenable primary material. For example a ring-shaped image projected by the image projector typically creates a ring of hardened primary material having a thickness corresponding to the layer thickness. The volume element forms a peripheral surface around the build dimension. This volume element is naturally in contact with hardenable primary material. For example in case a ring-shaped volume element is created by the image projection, such a ring-shaped volume element forms a generally cylindrical peripheral surface that is in contact with hardenable primary material (that was outside the image and thus not exposed to light).

In a further embodiment the method comprises the step of moving the volume element in the build dimension (in the dimension of the thickness). In particular, using Stereolithography, the volume element may be lowered to enable further hardenable primary material to flow over the volume element, or—alternatively—the volume element may be lifted to enable further hardenable primary material to flow beneath the volume element (in particular between the volume element and the support surface). Thus a further layer of hardenable primary material is created.

The method may further comprise the step of hardening a further volume element. The further volume element is hardened within the further layer of hardenable primary material.

The steps of hardening a volume element of the layer of hardenable primary material, moving the volume element in the build dimension, and hardening a further volume element are preferably repeated until the object is built up.

In an embodiment the hardenable secondary material is different from the hardenable primary material. For example the hardenable secondary material may be based on a chemical composition that is different from the chemical composition the hardenable primary material is based on. In particular the hardenable secondary material may have a color and/or a translucency that is different from the color and/or a translucency of the hardenable primary material.

In an embodiment the hardenable primary material is a photopolymerizable resin. Further the hardenable secondary material may be a photopolymerizable resin. The hardening is preferably performed by irradiation of the hardenable primary material and/or the hardenable secondary material by light. The light may be or comprise UV light as specified herein, blue light or white light.

In one embodiment hardenable primary material as well as the hardenable secondary material are each based on a formulation comprising acyl phosphine oxide, in particular Irgacure® TPO as a photoinitiator. The hardenable primary and second material may further be based on monomers with (meth)acrylate moieties as reactive groups and may contain fillers, dyes and colorants.

In an embodiment the mass inertial force generated in step (c) corresponds to a G-force of at least 100 G. A mass inertial force of 100 G has proven to be suitable to remove a mid to high viscos light hardenable material. The skilled person will recognize that the mass inertial force required for the cleaning step (c) may be lower for lower viscos materials and higher for higher viscos materials. The mass inertial force can typically be adjusted by adjusting the rotation speed. For example the radius is typically determined by the size of the object and the configuration of the post-processing device, so that the mass inertial force can be adjusted by the rotation speed at which the object is moved. Preferably the movement according to step (c) is performed with the object (including the excess material) being surrounded by air (in particular ambient air). This means that the excess material is in direct contact with air (in particular ambient air).

In one embodiment in step (c) the moving of the object is a rotation or spinning of the object. Accordingly the mass inertial force may be generated by a centrifugal force. Accordingly, step (c) may be defined by cleaning the object from excess hardenable material by spinning the object and thereby generating a centrifugal force in the excess hardenable material.

In the examples in Table 1 an object was moved (in particular rotated) according to step (c) of the method. The object was rotated at different rotation speeds (as specified in the left most column) and about different rotation axes. A point or area of the object that was positioned farthest away from the rotation axis was measured as radius (as specified in column r). In the example provided in the last line in Table 1 the object was placed in a laboratory centrifuge so that the rotation axis of the object was outside the object. The rotation speed n is also provided as a conversion from rounds per minute into rounds per second. The mass inertial force (provided in column a) can be determined by the formula:

$$a = (2*\pi*n)^2 * r$$

and the G-force can be determined by the formula:

$$G = \frac{a}{9.81 \text{ m/s}^2}$$

TABLE 1

| rotation Speed rpm* | n rotation Speed 1/s | r radius mm | a mass inertial force m/s² | G (factor of 9.81 m/s²) |
|---|---|---|---|---|
| 6000 | 100 | 15 | 5922 | 604 |
| 6000 | 100 | 7.5 | 2961 | 302 |
| 4000 | 66.7 | 20 | 3509 | 358 |

TABLE 1-continued

| rotation Speed rpm* | n rotation Speed 1/s | r radius mm | a mass inertial force m/s² | G (factor of 9.81 m/s²) |
|---|---|---|---|---|
| 4000 | 66.7 | 7.5 | 1316 | 134 |
| 1000 | 16.7 | 95 | 1042 | 106 |

*rpm = rounds per minute

It is noted that the centrifugal force on a particle of the excess material depends on the rotation speed and the radius at which that particle is located from the rotation axis. Accordingly excess material on an object having a non-uniform outer shape (like this is typically the case for dental restorations) is exposed to different centrifugal forces. It has however been found that a satisfying cleaning effect can be reached at the rotation speeds specified above at least for a majority of outer surface portions of the object that are located offset from the rotation axis of the rotation of the object. Further, it has been found that for those outer surface portions of the object that are located closer to (or in) the rotation axis, the cleaning step may be performed by rotating the object about a different further rotation axis.

Accordingly, the rotation of the object according to step (c) of the invention is preferably performed about at least a first rotation axis and a second rotation axis. Preferably the rotation about each of the first and second rotation axis comprises multiple revolutions. In particular the rotation about each of the first and second rotation axis according to step (c) is performed of time period of at least 15 seconds, for example between 15 seconds and 200 seconds. Thereby the first rotation axis and the second rotation axis have different orientations. Thus, the outside surface of an object built up by additive manufacturing can be effectively cleaned from excess material. The rotation of the object may be performed about a plurality of rotation axes or a rotation axis which can continuously incline in one, two or three dimensions. The embodiment in which the rotation axis can continuously incline in one, two or three dimensions may be achieved by a gimbal or Cardan suspension.

In one embodiment the rotation of the object about the first and second rotation axis is performed at the same rotation speed.

In an embodiment a first orientation of the first rotation axis and a different second orientation of the second rotation axis are adjustable or adjusted.

In one embodiment the object comprises a workpiece for providing a dental restauration from the object. Accordingly the workpiece may correspond to the dental restoration from which any further structure of the object is removed after the object was built up and cleaned. The workpiece may thus comprise a tooth shape. For example, the workpiece may be a dental crown, a dental bridge or a dental inlay. The object further preferably comprises a fixture portion. The fixture portion preferably does not form part of the dental restoration. Rather, the fixture portion may be configured for retaining the object in a post-processing device for cleaning the object from excess material. The object further may comprise one or more support structures that connect the workpiece and the fixture with each other. The support structures preferably also do not form part of the dental restoration. Accordingly, to obtain the dental restoration the method may comprise the step of removing the support structures from the workpiece.

The object may further comprise two or more workpieces that are arranged via support structures to one common fixture. This allows for simultaneously building up several dental restorations and for performing the cleaning step on one object but several dental restorations at a time.

In one embodiment the object comprises a workpiece for providing a dental appliance from the object. Such a dental appliance may comprise an orthodontic appliance, such as one or more orthodontic brackets or an orthodontic aligner. Generally an orthodontic appliance is used for aligning a patient's teeth from an initial position (sometimes referred to as "malocclusion") toward a desired end position (sometimes referred to as "ideal position").

An orthodontic bracket typically comprises a bracket base for attaching the bracket to a patient's tooth and a bracket body for receiving an orthodontic archwire within a slot formed by the bracket body. Further, an orthodontic aligner may be formed by a tray that replicates the negative shape of several teeth in a row of a patient's dentition. The orthodontic aligner may replicate the negative shape of the teeth with the teeth having a slightly different position compared to the initial position of the patient's teeth. Thus by placing the orthodontic aligner over the teeth for some time, the teeth are urged toward the position represented in the orthodontic aligner. An orthodontic appliance may further comprise a so-called orthodontic positioning tray or template. The orthodontic positioning tray is typically prepared for receiving orthodontic brackets which by help of the positioning tray can be positioned and installed on the patient's teeth.

An orthodontic appliance may further replicate the positive shape of a patient's teeth to form a positive model of the patent's teeth. The positive model may be used to make an orthodontic aligner or an orthodontic positioning tray by deep-drawing a plastic film over the positive model.

A dental appliance may further comprise a dental impression that replicates the negative shape of the teeth. Such a dental impression may be used to cast a plaster model of the patient's teeth or for completing an incomplete tooth by a dental material for restoring it.

In one embodiment the method further comprises the step of positioning the object in a motor driven post-processing device for cleaning the object in accordance to step (c). The post-processing device may be a shaker or a centrifuge.

In one embodiment the centrifuge comprises a motor and a spindle that is drivable or driven by the motor. The spindle is provided for retaining the object thereon. Accordingly the spindle may be regarded as a receptacle for receiving and/or retaining the object. In particular, the fixture portion of the object may be configured for mechanically coupling with the spindle of the centrifuge. For example, the fixture portion may have a cavity for plugging the object on the spindle via a (preferably slight) press fit. Preferably, the fixture portion has two cavities extending along different orientations for plugging the object on the spindle for a rotation about two different rotation axes.

In a further embodiment the centrifuge comprises a motor drivable or motor driven rotor at which one or more holders are suspended. Preferably the holders are pivotably suspended at the rotor so that during a rotation of the rotor the holder(s) pivot radially outwardly in consequence of a centrifugal force. The holders are typically provided for receiving an object for centrifuging. Further, a tray may be provided for positioning and retaining the object therein. The tray may be further retainable and/or receivable within the holder.

In an embodiment the shaker comprises a motor and a converter for converting a rotation of the rotor in a movement along a non-full-circular path. The non-full-circular path may be a linear or partial circular movement (for example over less than 360 degrees). Thus the shaker may move the object between two extreme positions. Upon approaching and leaving the extreme positions the object (and therefore the excess material) is exposed to mass inertial forces due to the deceleration and acceleration, respectively. A similar effect can be reached by movement on alternative paths. Such alternative paths may be a combination of a linear (partial circular) and a full circular movement. For example non-full-circular path may be a movement along a path that is shaped like an eight (or essentially like an eight) or a movement along an oval (or essentially an oval). Further, there are shakers which provide a movement generally linearly or partial circular but which allow for an additional movement laterally of the linear (partial circular) movement. In such a shaker the non-full-circular path is composed of a relatively arbitrary lateral movement and a linear (or partial circular) movement. Shakers that are based on the principles disclosed herein are for example used in the field of dentistry for mixing amalgam or powder liquid materials.

In an embodiment the method further comprises the step of placing the object in a tray. The tray preferably comprises a receptacle for receiving the object. The receptacle may be formed as a through-hole having a stepped configuration. Thus the through-hole may extend along a wider portion on one side of the step and a narrower portion on the other side of the step. The step of the through-hole may be used to retain the object thereon. In particular, the fixture portion of the object may be sized and shaped to fit in the wider portion and to rest on the step of the through-hole while the workpiece of the object extends in or through the narrower portion of the through-hole.

In a further embodiment the method comprises the step of placing the tray in a centrifuge. The tray may be placed in the holder of a centrifuge as described above.

In a further embodiment the method comprises the step of centrifuging the object within the tray by the centrifuge. Thereby the object is preferably cleaned from excess material.

The invention further relates to a use of a centrifuge for cleaning an object from excess material. The object is made by additive manufacturing. The object is preferably made by an additive manufacturing process that is based on a photopolimerizable resin or material, for example by Stereolitographie, in particular Digital Light Processing as described herein. The object is preferably at least partially or partially formed of a hardened primary material. The hardened primary material is obtainable or obtained by hardening a hardenable primary material. The excess material may adhere at the object, in particular at at least an outer surface of the object. The excess material is formed by at least one of the hardenable primary material and a hardenable secondary material. Although not generally desired, the object may further comprise hardenable primary material between the hardened primary material and the excess material. For example the hardenable primary material and the excess material may form one film that naturally results from the additive manufacturing process used for building up the object. A (typically major) part of the film may be removable by the cleaning step according to the method of the invention. Such removable part of the film corresponds to the excess material. On the other hand a remaining (typically minor) part of the film may not be removable (at least from an economic point of view) and may form part of the object. This remaining part of the film may be post-hardened or post-cured by exposing it to light of an appropriate wavelength.

The invention further relates to a centrifuge. The centrifuge comprises a tray as also disclosed with other aspects of the invention herein. The tray comprises a plurality of receptacles for receiving a corresponding plurality of objects that are made by additive manufacturing. The centrifuge further comprises a rotor to which at least one holder is pivotably suspended. Further, the tray is removably retainable or retained in the holder. The centrifuge is preferably configured for cleaning the objects from excess material by centrifuging the objects and thereby generating a centrifugal force in the excess material.

In an embodiment the receptacles are provided in the form of through-holes. The through-hole may extend through the tray and form respective receptacle openings in the tray. A collecting vessel is preferably provided that spans the receptacle openings. The collecting vessel may be cup-shaped and preferably forms an opening in or adjacent which the tray can be arranged. The collecting vessel therefore is arranged so that excess material separating from the objects through centrifuging is collected in the collecting vessel.

In one embodiment the tray comprises a counterbalance that allows for balancing a rotor of a centrifuge that comprises two or more rays. The counterbalance may be adjustable in position to account for different unbalances. Further the counterbalance may be replaceable by a different counterbalance to account for different unbalances.

In a further embodiment at least one of the tray, the collecting vessel or the holder may be rotatable relative to the rotor about two different rotation axes. For example the holder is preferably rotatable about a pivot axis that is perpendicular to the rotation axis of the rotor. Therefore the holder can pivot in a dimension radially of the rotation axis (like a chairoplane). Further, the tray and/or the collecting vessel may be rotatable about a rotation axis that is perpendicular to the pivot axis. Thus, during centrifuging the object may orient about different rotation axes. Therefore the cleaning effect may be maximized.

In an embodiment the plurality of receptacles comprise at least one object or a plurality of objects. Further, in each of the plurality of receptacles one object may be received. It is however noted that in only some of the plurality of receptacles an object may be received.

DETAILED DESCRIPTION OF THE INVENTION

Figure 1:
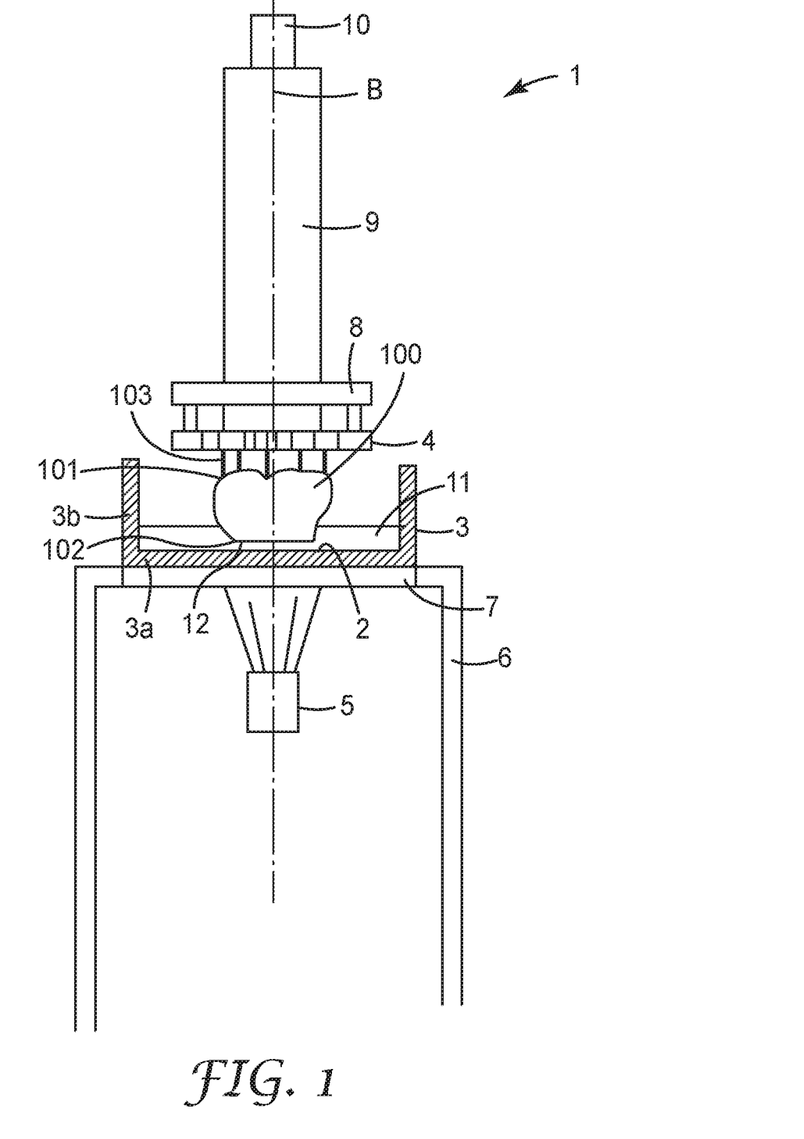
FIG. 1 is a schematic view of a device for additive manufacturing as it may be used with the present invention.

FIG. 1 shows a device 1 for making a physical object 100 by additive manufacturing according to the method of the invention. In the example the device 1 is used for building up a dental restoration. Accordingly the physical object 100 in the example is a dental restoration. Dental restorations comprise for example dental crowns, dental bridges, dental inlays or one or more replacement teeth.

The device 1 comprises a vat 3 in which a hardenable primary material is provided. For providing the hardenable primary material the device 1 may have one or more tanks (not illustrated) for storing the hardenable primary material and means for dispensing portions of the hardenable primary material into the vat 3. The hardenable primary material may be selectively provided at different tooth colors, as desired. In the example the hardenable primary material is a light hardenable resin (also generally referred to as photopolymerizable resin in the field of dental material practice). The hardenable primary material has a liquid or pasty (and thus flowable) consistency. The vat 3 has a light permeable base 2. In the example, the overall vat 3 is made of a transparent material. Suitable materials for the vat 3 include, for example, silica glass or polycarbonate. Other materials are possible as appropriate.

The vat 3 is generally cup-shaped. In particular, the vat 3 has a bottom wall 3a, a side wall 3b and forms an opening opposite of the bottom wall 3a. The vat 3 in the example is generally circular (has a circular side wall), although other geometries are possible.

The device 1 is generally configured to build up an object 100 by Stereolithography. This means that the physical object is built up by successively hardening portions, in particular layers, of the hardenable primary material. Accordingly each built up layer consists of hardened primary material. The hardened primary material is solid (and not flowable). The dimension in which the layers are "stacked" or provided onto each other is referred to herein as "build dimension" and is designated as "B" in the Figure. The shape in the remaining two dimensions is controlled by the shape of each of the layers of hardened primary material.

The shape of the individual layers of hardened primary material is determined by exposure of selected portions of a layer of hardenable primary material. This is performed by a light source 5, which in the example is an image projector. The image projector is controlled (in particular provided with images) by a computer based on a three-dimensional virtual object that is virtually sliced in layers of a desired thickness. The image projector may be based on Digital Light Processing™. Digital Light Processing (DLP) uses micro-mirrors arranged in a matrix on a semiconductor chip. Such semiconductor chips are known as Digital Micromirror Devices ("DMD"). Typical mirrors of a DMD have a size of about 5 μm or less. Each of the mirrors are movable between two positions by control of the semiconductor. In the one position the mirror is positioned to reflect light directed on the mirror through the light output, whereas in the other position the mirror is positioned so that the light directed on the mirror does not exit the projector. Each mirror typically represents one pixel in the projected image so that the number of mirrors typically corresponds to the resolution of the projected image. The skilled person will recognize that other projector techniques or a laser beam may be likewise used with the device of the invention.

The light source 5 is arranged beneath a light permeable area 7 of the device 1. The light permeable area 7 is arranged generally horizontal (perpendicular to the direction of the force of gravity) and the light source 5 is arranged of that side of the light permeable area 7 that faces toward the center of gravity. In the example, the light permeable area 7 is provided in a housing 6 of the device. The vat 3 is removably placed with the light permeable base 2 on the light permeable area 7. Therefore, light emitted by the light source 5 and transmitted through the light permeable area 7 of the housing 6 is also transmitted through the light permeable base 2 of the vat 3. Further, because the vat 3 is removably placed in the device 1, the vat 3 can be replaced by another vat, for example a vat for use with a differently colored hardenable primary material.

It is preferred that the light permeable area 7 and the light permeable base 2 are transparent and clear. Thus, the image sharpness of the image projected to the light permeable base can be maximized. This is also a basis for building up the object at maximized accuracy. It is noted that in another example the light permeable area and the light permeable base may be combined in one piece.

The device 1 comprises a build carrier 4. The build carrier 4 is arranged on that side of the light permeable area 7 opposite of the light source 5. The build carrier 4 is configured to hold the object built up by the device. The build carrier 4 can be positioned relative to the light permeable base 2 (and the light permeable area 7) by computer control. In particular, the build carrier 4 is movable at least in the build dimension B. In another example the build carrier may be movable in one or two dimensions perpendicular to the build dimension.

The object 100 is build up in the device 1 in the build dimension B. In particular the build-up process is performed downwards (in the direction of the force of gravity) in relation to a portion or layer of the object created first. This is achieved in that the device 1 pulls the object 100 successively upwards (away from the center of gravity and away from the light permeable area 7) as the object 100 is built up.

The build carrier 4 is connected to a linear drive 9 via a support 8. The linear drive 9 in the example has a spindle (not shown) which is mechanically coupled to the support 8 such that the support 8 can be moved in two directions in the build dimension B. The linear drive 9 further has a motor 10 and a position measuring device. Thus, the support 8 and the attached build carrier 4 can be accurately positioned by control of the device 1 via Computer Numerical Control (CNC). The skilled person will recognize that the support can be itself configured as build carrier in another example. Further the skilled person will recognize that the build carrier may be connected by other means with the linear drive. In addition other drives than a spindle drive are possible.

At the illustrated stage the object 100 (comprising a dental crown, in the example) is already partially built up in the device 1. Generally, the object 100 is build up in a region between the build carrier 4 and the light permeable base 2. In particular, the object 100 is carried via support structures 103 at a first end 101 of the object 100 by the build carrier 4. The build carrier 4 at the stage shown is positioned such that a space 12 is formed between an opposite second end 102 of the object 100 and the light permeable base 2. The space 12 has a pre-determined thickness in the build dimension B. Further, a hardenable primary material 11 is provided in the vat 3. The amount of the hardenable primary material 11 is selected such that a bath from primary hardenable of a pre-determined fill level is formed. The fill level of the hardenable primary material 11 corresponds to or is higher than the thickness of the space 12. Accordingly, the space 12 is entirely filled with the hardenable primary material 11. At this stage the image projector 5 can be used to emit light through the light permeable base 2 into the space 12. The light is preferably emitted in the form of a two-dimensional pattern in a plane parallel to the light permeable base 2. Accordingly, the hardenable primary material 11 is irradiated locally in accordance to the pattern of the light pattern. In particular, any light pixel of the pattern causes such portions of the hardenable primary material 11 to harden which are exposed to the light of the light pixel. The hardenable primary material 11 is typically light permeable to a certain extent so that the light penetrates entirely through the hardenable primary material 11 in the space 12. Therefore, by hardening of the hardenable primary material, portions (in particular layers) of hardened primary material are created. These portions of hardened primary material connect with the object 100 as far as already built up and become part of a more complemented object. From this stage the complemented object can be retracted from the light permeable base 2 so as to create a new space filled with not yet hardened hardenable primary material which can be irradiated by a further light pattern to further complement the object, and so on, until the object is built up layer by layer completely. The build carrier 4 has a retention surface that faces the light permeable area 7 and at which the object 100 adheres. The retention surface provides for a retention of the hardened primary material. The retention of the hardened primary material is better than the retention of the hardened primary material on the light permeable base 2. Thus, upon puling the object away from the light permeable base, the object stays retained at the build carrier while it disconnects from the light permeable base. The skilled person will recognize several technical possibilities of controlling the better adhesion of the hardened primary material at the build carrier, including the selection of materials for the build carrier 4 and the light permeable base 2, the configuration of the surface roughness of the build carrier 4 and the light permeable base 2, the arrangement of retention elements, or a combination thereof. The light permeable base 2 is optionally coated with a non-stick coating, for example a polytetrafluoroethylene. Thus, the hardened primary material loosens from the light permeable base while the hardened portions adhere to each other. Therefore, any breaking apart of the built up object during retraction can be prevented.

During retraction of the object hardenable primary material in the vat is—by nature of physics—sucked (or pressed by the ambient pressure) in to the emerging space. To prevent the fill level from dropping below the thickness of the space (which could cause a void in the object) further of the hardenable primary material is provided in the vat prior to and/or simultaneously with retraction of the object.

Once the object 100 is built up entirely any support structures 103 are removed, for example by breaking away from the object 100. Further, excess (liquid or pasty) hardenable primary material that adheres to the object is desirably removed. Excess hardenable primary material may adhere to the object because hardenable primary material from which the object is successively pulled out from typically does not run off entirely. Although such adhering excess hardenable primary material may be hardened (post-cured) to save any cleaning step it has been found that the adhering hardenable primary material may not form a uniform layer. Accordingly, adhering excess hardenable primary material may negatively affect the accuracy of the shape of the object.

Figure 2:
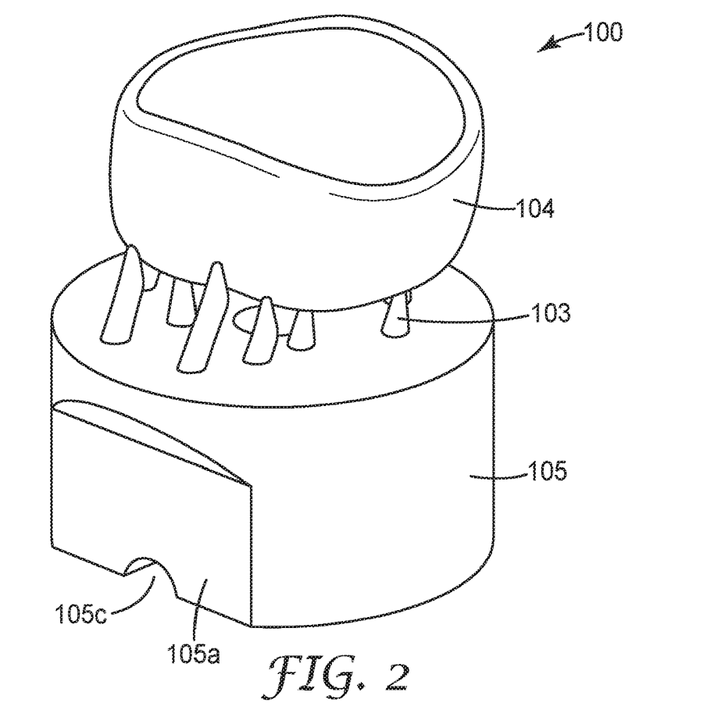
FIG. 2 is a perspective view of an object that may be made using the method of the invention.
Figure 3:
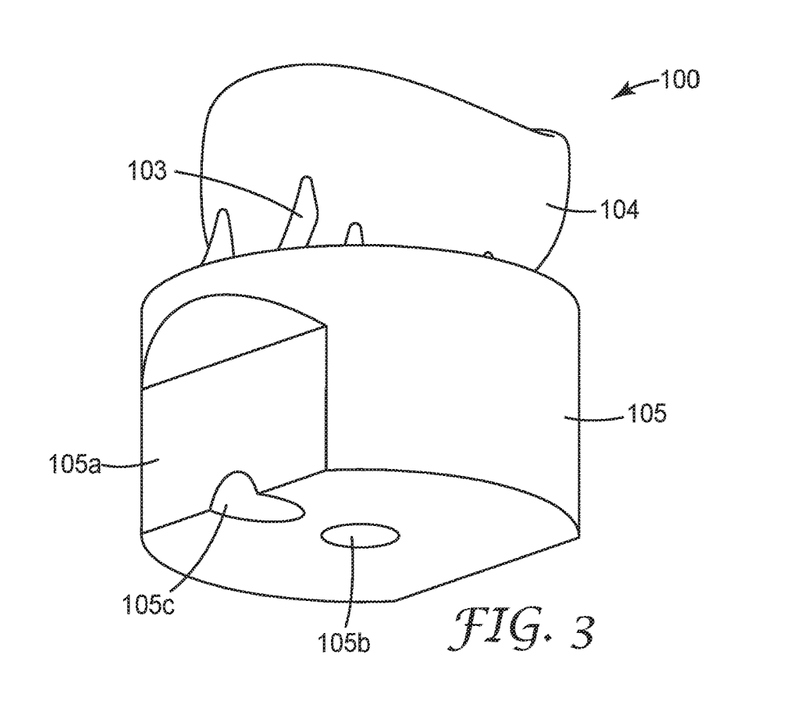
FIG. 3 is a different perspective view of the object shown in FIG. 2.

FIGS. 2 and 3 shows an object 100 that is built up in a device as described in FIG. 2. The object 100 comprises a workpiece 104—in the example is a dental crown—which is connected via support structures 103 to a fixture portion 105. The workpiece 104, the support structure 103 and the fixture portion 105 are built up from hardened primary material. The fixture portion 105 allows handling and reproducible positioning of the object 100 in any so-called post-processing steps. However, the fixture portion 105 is—like the support structures 103—form so-called lost parts, meaning parts that are used for manufacturing only and removed from the workpiece after. A post-processing step may include cleaning, post-curing, cutting, grinding and/or removing of the support structures 103 from the workpiece 104 (dental crown), for example. In the example, the fixture portion 105 has a flat 105a that allows for reproducible positioning of the object 100 at a predetermined angular position. Further, a first and a second cavity 105b, 105c are provided in the fixture portion 105. The first and second cavity 105b, 105c (see FIG. 3) allow for mounting the object 100 on a motor driven spindle as further described in more detail below. The skilled person will be able to provide other structures that allow for positioning of the object in a post-processing device. Examples include, a thread, dovetail structure, a part of bayonet lock and other structures as appropriate.

Figure 4:
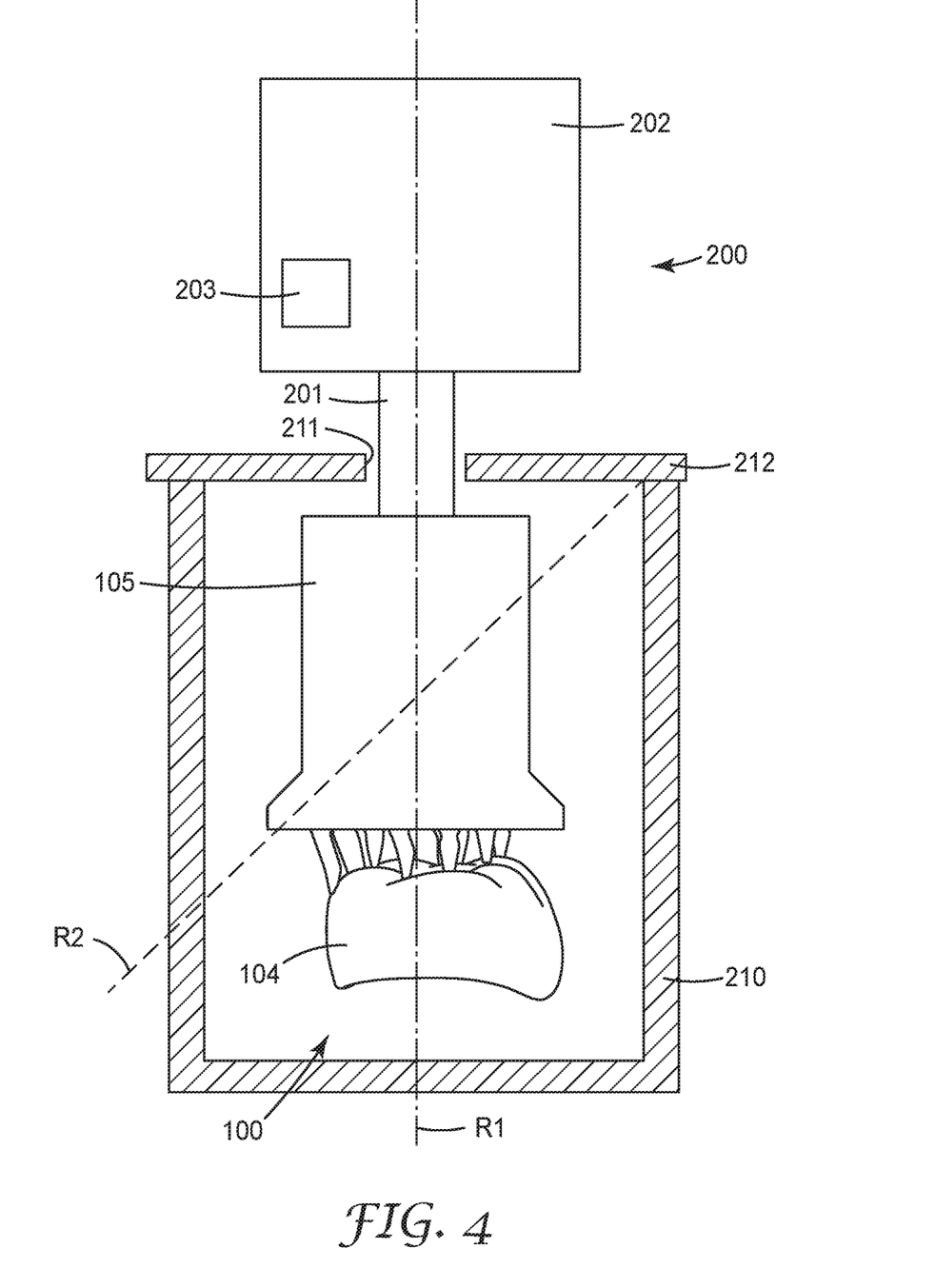
FIG. 4 is a partial cross-sectional view of an object attached on a centrifuge according to an embodiment of the invention.

FIG. 4 shows the object 100 attached on a centrifuge 200. The centrifuge 200 has a motor driven spindle 201. In particular, the object 100 is received with the fixture portion 105 on the spindle 201, in the example by a press fit. An anti-twist structure for preventing a movement of the object 100 relative to the spindle 201 may be provided alternatively or in addition to the press fit. Further, the centrifuge 200 has a motor unit 202 for driving the spindle 201. The motor unit 202 has an electric motor (not shown) that is connected or connectable to a power source. A control unit 203 is provided as part of the centrifuge 200 or as an external unit (not shown) for adjusting the rotation speed of the motor and thus for adjusting the rotation speed of the spindle 201.

In the example the object 100 is attached on the spindle 201 for rotation about a first rotation axis R1. The first rotation axis R1 extends through the object 100. In the example the first rotation axis R1 approximates an axis of symmetry of the object. The term "approximates" addresses the fact that a dental restoration part typically replicates a natural tooth structure which is not exactly symmetric. Further, the first rotation axis R1 is parallel to the build dimension (B in FIG. 1).

The object 100 is further prepared (by the second cavity 105b shown in FIGS. 2 and 3) for an attachment on the spindle 201 for rotation about a second rotation axis R2 which is inclined relative to the rotation axis R1. The inclination angle between the first and second axis R1, R2 in the example is 50 degrees. Other inclination angles are possible, as appropriate. Further the second rotation axis R2 also extends through the object 100. Therefore, the object 100 can be rotated subsequently about the first and the second rotation axis R1, R2. The rotation of the object 100 causes excess liquid or pasty material adhering to the object 100 to separate from the object. It has been found that thus the object 100 can be physically cleaned from excess hardenable primary material. Although the cleaning effect typically does not result in 100% of the hardenable primary material to be removed from the object it has been found that about between 80% to 95% of the hardenable primary material can be removed. Further, any remaining hardenable primary material on the object typically forms a uniform layer. Thus the precision of the overall shape of the object can be maximized.

The cleaning effect is caused by a mass inertial force, in particular a centrifugal force that acts on the excess material that adheres to the object 100. Any excess material that is positioned on the first and/or second rotation axis R1 or R2 theoretically may not be effected by such centrifugal force. Further the centrifugal force exerted on any excess material that is positioned close to any of the first and second rotation axis R1, R2 is lower than the centrifugal force exerted on excess material being positioned farther away from the first and/or second rotation axis R1, R2. It has however been found that any impact on the cleaning effect from varying centrifugal forces can be minimized by rotating the object about at least two rotation axes (for example R1, R2).

The first and second cavity 105b, 105c are preferably positioned and oriented relative to the object 100 so that a rotation of the object about the first and second rotation axis R1, R2, respectively, of each of the first and second cavity 105b, 105c is balanced. Preferably the first and second rotation axis R1, R2 form center axes of the first and second cavity 105b, 105c, respectively. The position and orientation of the first and second cavity 105b, 105c for a balanced rotation can be determined by computer aid during the design of the object. Further, the fixture portion may be provided with additional structure and/or with voids for balancing the object for a rotation.

The rotation speed is selected in accordance to the physical properties (in particular the rheological behavior) of the hardenable primary material and the size of the object. In the example the object 100 has a greatest diameter of about 10 mm around the first rotation axis R1.

A rotation speed of approximately 6500 rounds per minute (rotated in air) has resulted in a good cleaning effect without causing mechanical damages to the object due to forces occurring from any unbalanced mass of the object. It is noted that, the object may be built up in a way that an unbalanced mass that inherently exists due to the shape of the workpiece 104 is compensated by a counterbalance provided by the shape of the fixture portion 105.

The G-force in this example was 236 G with respect to any points or areas at a distance (or radius) of 5 mm (10 mm diameter of the object divided by 2). There was still an excellent cleaning effect at areas of the object which had a distance or radius from the rotation axis of 2.5 mm where the G-force was still above 100 G.

The object 100 is rotated within a collecting vessel 210. This is to collect the hardenable primary material ejecting from the object (and to avoid the hardenable primary material from contaminating the surrounding area). The collecting vessel 210 in the example contains air (is empty). In another example a solvent may be provided in the collecting vessel for removing any excess material from the object. Such a cleaning may however generally not be caused by mass inertial force and may therefore be performed in addition to the method step of the invention.

It is noted that the position and orientation of the first and second rotation axis R1, R2 can be selected otherwise.

Figure 5:
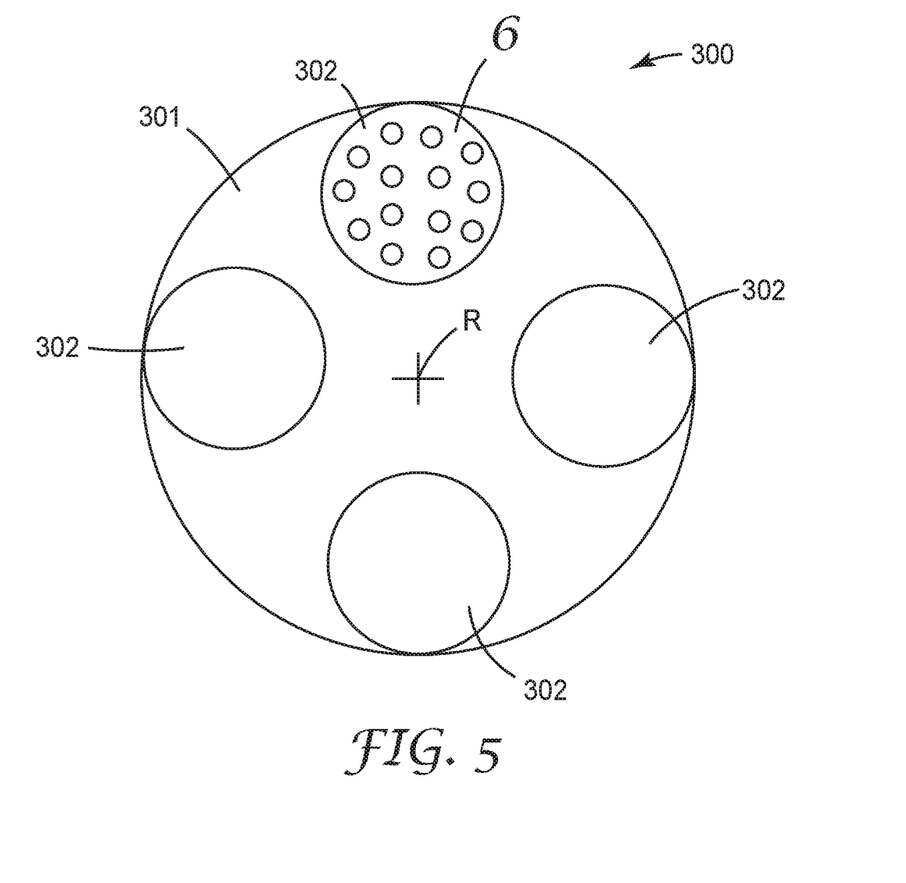
FIG. 5 is a top view on a centrifuge according to an embodiment of the invention.

FIG. 5 shows an exemplary alternative centrifuge 300. Centrifuges like the example shown or similar ones are available on the market for use in chemical or biochemical laboratories, for example. The centrifuge 300 has a rotor 301 which has four holders 302 each for accommodation of one or more samples for spinning (or centrifugalizing). The rotor 301 is rotatable about a rotation axis R by motor power at adjustable speed.

Figure 6:
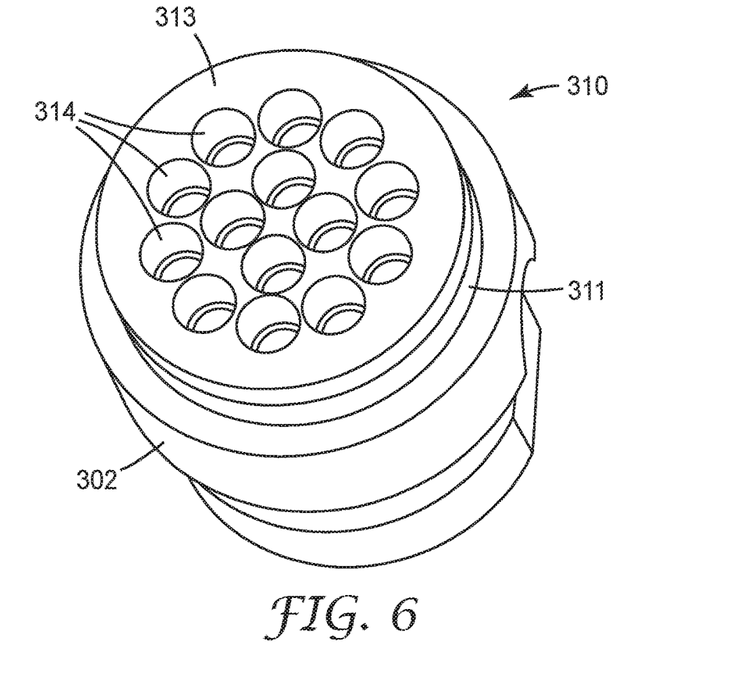
FIG. 6 is a perspective view of a tray assembly as it may be used with the present invention.
Figure 7:
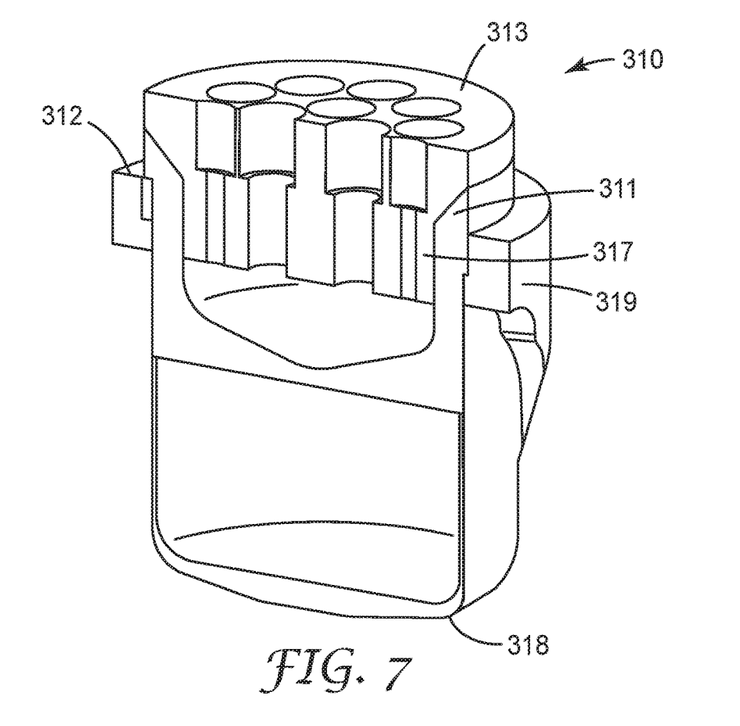
FIG. 7 is a perspective cross-sectional view of the tray assembly shown in FIG. 6.

In the example in each of the holders 302 a tray assembly 310 (which is not part of the prior art) is placed as described in more detail in FIGS. 6 and 7.

FIGS. 6 and 7 show a holder 302 in which the tray assembly 310 is received. The holder 302 has a top end 319 and a bottom end 318. Further, each holder 302 has a longitudinal axis A in a dimension of the holder 302 between the top end and the bottom end. The holder 302 is rotatably suspended (not illustrated in this view) at the rotor (301 in FIG. 5). The holder 302 is suspended at the rotor adjacent the top end of the holder 302 for a rotation radially of the rotation axis (R in FIG. 5). Thus, in operation of the centrifuge 300 the holders 302 tilt with their bottom ends 318 radially outwardly in consequence of a centrifugal force caused by the rotation of the rotor of the centrifuge. The tilting can be imagined like the radial movement of the chairs of a chairoplane. If the rotation speed of the rotor is zero the holders 302 are oriented with their longitudinal axes A vertical (essentially in line with the force of gravity). The higher the rotation speed of the rotor, the more incline the holders 302 with the longitudinal axis A approximating a radial direction of the rotation axis. The holder 302 in the example is cup-shaped and forms an opening 312 (see FIG. 7) at the top end 319. Further the holder 302 is closed on the bottom end 318. Thus any substance that escapes from centrifuged objects can be captured within the holders and contamination of the centrifuge can be prevented. The skilled person will however understand that the holder may have different shapes depending on the type of centrifuge used.

The tray assembly 310 is received within or on the opening 312 of the holder 302. In the example the tray assembly 310 comprises a tray 313 and a collecting vessel 315. The collecting vessel 315 is cup-shaped and forms a socket 317 in which the tray 313 is received. Therefore, excess hardenable primary material that is centrifuged away from objects received in the tray 313 is captured within the collecting vessel 315. This allows for replacing the whole tray assembly 310—including any centrifuged objects and the removed hardenable primary material—by a new tray to be centrifuged. The holders thereby can be kept clean so that a mass production is enabled through replaceability of the tray assemblies and the absence of maintenance breaks for cleaning the holders.

It is noted that, although not preferred, in another example a similar tray may be received directly in the holder 302.

Figure 8:
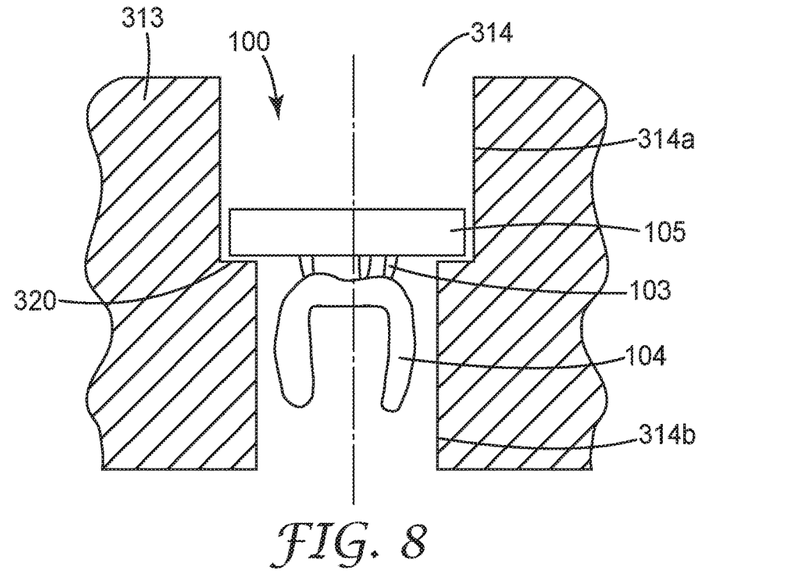
FIG. 8 is a partial perspective view of a tray as it may be used with the present invention.

The tray 313 has a plurality of receptacles 314. Each of the receptacles 314 in the example forms a through-hole. The receptacle 314 is shaped and sized so that a built up object 100 can be received and retained therein as shown in FIG. 8.

In the example the through-hole in the tray 313 has a stepped configuration with the step 320 providing a retainer that retains the object 100 and prevents the object 100 to pass through the through-hole. The step 320 is formed by a transition between a first portion 314a and a second portion 314b of the through-hole of the receptacle 314. The first portion 314a is wider in cross-section than the cross-section of the second portion 314b. In the example the first and second portion 314a, 314b are cylindrical and a first cross-section of the first portion 314a has a greater diameter than a second cross-section of the second portion 314b. The object 100 corresponds to the object referred to in FIGS. 2 and 3 and therefore comprises a workpiece 104 connected via support structures 103 to a fixture portion 105. The object 100 is placed with the workpiece 104 downwards (toward the center of gravity) into the receptacle 314. The fixture portion 105 is greater in size than the workpiece 104 and dimensioned to fit in the first portion 314a. Accordingly the fixture portion 105 is positioned in the first portion 314a of the receptacle and the remainder of the object 100 protrudes in (or through) the second portion 314b of the receptacle.

In one example (not shown) one fixture portion may carry a plurality of (eventually different) workpieces. In this example a tray may have one or more larger receptacles (compared to the receptacles for receiving object with one workpiece only).

Figure 9:
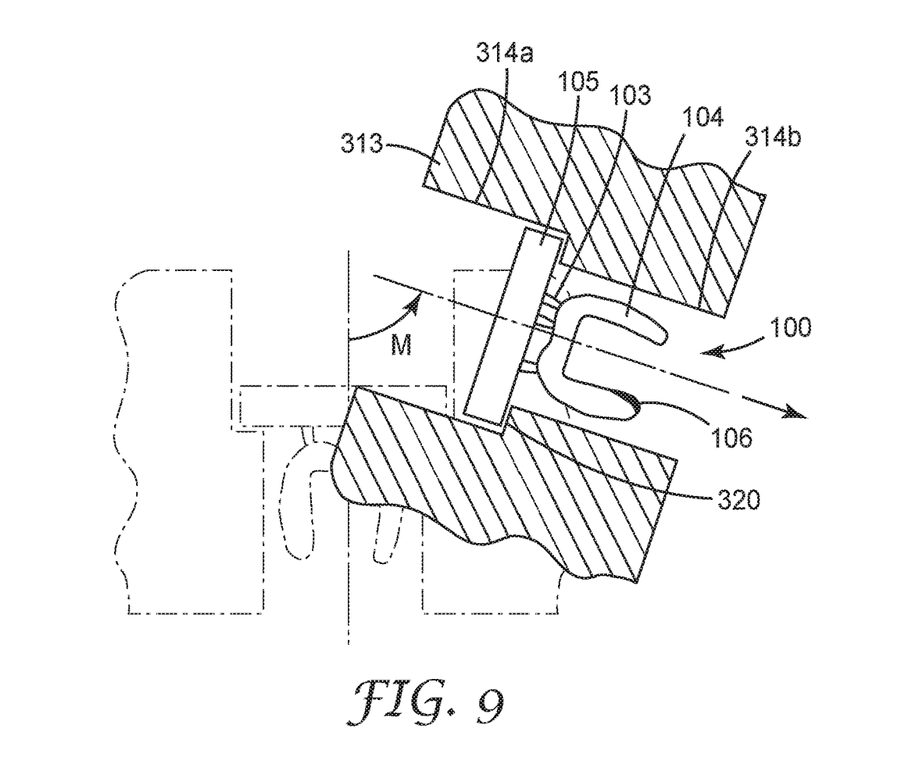
FIG. 9 is a partial perspective view of the tray of FIG. 8 in operation of a centrifuge in which the tray is used.

In FIG. 9 the movement M of a holder and thus of the tray 313 is indicated during centrifuging. In consequence of the rotation of the rotor of the centrifuge the tray 313 inclines due to a centrifugal force. Depending on the rotation speed of the rotor and the weight of the holder including the tray the inclination of the tray establishes due to a resulting force F of the centrifugal force and the weight. It has been found that the removal of hardenable primary material from a workpiece forming an undercut (like the undercut 106 indicated in the Figure) can be facilitated by adjusting of the inclination of the workpiece, and that the inclination of the workpiece can be adjusted by the rotation speed of the centrifuge. Further, because the weight of the holder including the tray and the object can be determined already during the design of the object it has been found that the desired rotation speed (that also accounts for undercuts of the workpiece) can be predetermined before centrifuging (for example during the design of the object).

In this regard it is noted that any cavity in an object may form an undercut with to an orientation of the cavity with respect to a resulting force acting on the object in a centrifuge. Therefore an object may be successively centrifuged at different speeds to remove hardenable primary material from different undercuts. The tray, loaded with a particular object, may therefore be provided with a data carrier, for example a printed label or a RFID tag, in which data about the rotation speed or speeds is stored. The centrifuge may have a reading device for the data carrier for automatically running a centrifuging program in accordance to the data read from the data carrier.

What is claimed is:

1. A method of making a physical object by additive manufacturing, the method comprising:

providing a hardenable primary material, wherein the hardenable primary material is liquid or pasty;

building up the object by successively hardening layers of the hardenable primary material; and cleaning the object from excess material by moving the object and thereby generating a mass inertial force in the excess material, wherein the excess material is formed by at least one of the hardenable primary material and a hardenable secondary material;

wherein the moving of the object is a rotation of the object; and wherein the rotation is performed about at least a first rotation axis and a second rotation axis, wherein the first rotation axis and the second rotation axis have different orientations.

2. The method of claim 1, wherein the hardenable secondary material is different from the hardenable primary material.

3. The method of claim 1, wherein the hardenable primary material is a photopolymerizable resin and wherein the hardening is performed by irradiation of the hardenable primary material by light.

4. The method of claim 3, wherein the hardenable primary material is based on a formulation comprising camphorquinone as a photoinitiator.

5. The method of claim 1, wherein the mass inertial force corresponds to a G-force of at least 100 G.

6. The method of claim 1, wherein the object comprises a workpiece for providing a dental restauration from the object.

7. The method of claim 6, wherein the object further comprises a fixture portion that does not form part of the dental restoration, wherein the fixture portion is configured for retaining the object in a post-processing device for cleaning the object from excess material.

8. The method of claim 1, further comprising positioning the object in a motor driven post-processing device for cleaning the object.

9. The method of claim 6, further comprising placing the object in a tray that comprises a receptacle for receiving the object, placing the tray in a centrifuge and centrifuging the object within the tray by the centrifuge.

10. The method of claim 1, wherein moving the object comprises rotating the object at a rotational speed that is selected based on the rheological behavior of the hardenable primary material and the size of the object.

* * * * *

UNITED STATES PATENT AND TRADEMARK OFFICE
CERTIFICATE OF CORRECTION

PATENT NO.        : 11,433,658 B2                                      Page 1 of 1
APPLICATION NO.   : 16/631199
DATED             : September 6, 2022
INVENTOR(S)       : Anja Friedrich et al.

It is certified that error appears in the above-identified patent and that said Letters Patent is hereby corrected as shown below:

In the Claims

<u>Column 18</u>
Line 30 (approx.), In Claim 6 delete "restauration" and insert -- restoration --, therefor.

Signed and Sealed this
Twenty-seventh Day of August, 2024

Katherine Kelly Vidal
*Director of the United States Patent and Trademark Office*